(12) United States Patent
Zhao et al.

(10) Patent No.: US 6,824,690 B1
(45) Date of Patent: Nov. 30, 2004

(54) ZIRCONIUM-MODIFIED MATERIALS FOR SELECTIVE ADSORPTION AND REMOVAL OF AQUEOUS ARSENIC

(75) Inventors: Hongting Zhao, Longmont, CO (US); Robert C. Moore, Edgewood, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/269,596

(22) Filed: Oct. 11, 2002

(51) Int. Cl.$^7$ ................................................. C02F 1/28

(52) U.S. Cl. ...................... 210/682; 210/688; 210/263; 210/287; 427/215; 428/403

(58) Field of Search ................................ 210/681, 682, 210/683, 688, 263, 287; 428/403, 408; 427/215

(56) References Cited

U.S. PATENT DOCUMENTS

| | | | |
|---|---|---|---|
| 4,046,687 A | | 9/1977 | Schulze |
| 4,178,270 A | * | 12/1979 | Fujita et al. ................ 252/184 |
| 4,474,853 A | * | 10/1984 | Watanabe .................... 428/403 |
| 5,556,545 A | | 9/1996 | Volchek et al. |
| 5,948,265 A | * | 9/1999 | Wakamatsu et al. ........ 210/683 |
| 6,077,809 A | | 6/2000 | Suzuki et al. |
| 6,383,395 B1 | | 5/2002 | Clarke et al. |

FOREIGN PATENT DOCUMENTS

JP  H06-304573  11/1994

OTHER PUBLICATIONS

Viraraghavan, T., et al., "Arsenic in Drinking Water—Problems and Solutions", *Wat. Sci. Tech.,* vol. 40, No. 2, pp 69–76 (1999).
Yamanaka, S., et al., "High Surface Area Solids Obtained by Reaction of Montmorillonite with Zirconyl Chloride," *Clays and Clay Minerals,* vol. 27, No. 2, pp 119–124 (1979(.
You, Y.W., et al., "Removal of Arsenite from Aqueous Solutions by Anionic Clays," *Environmental Technology,* vol. 22, pp 1447–1457 (2001).
Garbos, S. et al., "Simultaneous Determination of Se and As by Hydride Generation Atomic Absorption Spectrometry with Analyte Concentration in a Graphite Furnace Coated with Zirconium," *Spectrochimica Acta,* Part B, vol. 50, pp 1669–1677 (1995).
Hashitani, H., et al., "Preconcentration Method for Phosphate in Water Using Activated Carbon Loaded with Zirconium," *Dept of Chemistry, Faculty of Science, Shimane University,* Matsue 690 Japan (May 13, 1986).
Kou, M.R. Sun, et al., "A Thermal Study of Zr–Pillared Montmorillonite," *Thermochimica Acta,* vol. 323 (pp 145–147 (1998).

Latva, S., et al., "Separation of Arsenic Species in Aqueous Solutions and Optimization of Determination by Graphite Furnace Atomic Absorption Spectrometry," *Analytica Chimica Acta,* vol. 418, pp 11–17 (2000).
Suzuki, T.M., et al., "Preparation of Porous Resin Loaded with crystalline Hydrous Zirconium Oxide and its Application to the Removal of Arsenic," *Reactive & Functional Polymers,* vol. 43, pp 165–172 (2000).
Volzone, C., et al., "Influence of Hydrolyzed Zirconium Solutions on the OH–Zr–Montmorillonite," *Clays and Clay Materials,* vol. 47, No. 1, pp 109–111 (1999).
Yuchi, A., et al., "Ligand–Exchange Chromatography at Zirconium (IV) Immobilized on IDA–Type Chelating Polymer Gel," *Anal. Chem.,* vol. 72, pp 3642–3646 (2000).
Yalel, C., et al., "Determination of Arsenic (V) and Arsenic (III) Species in Environmental Samples by Coprecipitation and Zirconium Hydroxide and Pre–Atomization Atomic Absorption Spectrometry," *J. of Analytical Atomic Spectrometry,* vol. 8, pp 379–381 (Mar. 1993).
Y.W. You, et al., "Removal of arsenite from aqueous solutions by anionic clays", *Environmental Technology* 22(#12):1447–1457 (2001).
P. Bermejo–Barrera, et al., "Selective Medium Reactions for the 'Arsenic (III)', 'arsenic (V)', dimethylarsonic acid and monomethylarsonic acid determination in Waters by Hudride Generation On–Line Electrothermal Atomic Adsorption Spectrometry with In Situ Preconcentration on Zr–Coated Graphine Tubes," *Analytica Chimica Acta,* vol. 374, pp 231–240 (1998).
P. Bermejo–Barrera, et al. "A Comparison of different chemical modifiers for the direct determination of arsenic in sea water by electrothermal atomic absorption spectrometry", *Fresenius Journal Of Analytical Chemistry* 355(#2):174–179 (1996).
Y.L. Chen, et al., "Determination of arsenic(v) and arsenic(iii) species in environmental–samples by coprecipitation with zirconium hydroxide and pre–atomization atomic–absorption spectrometry", *Journal Of Analytical Atomic Spectrometry* 8(#2):379–381 (1993).
Chwirka, Joseph D., et al., "Removing Arsenic from Groundwater," Regulatory Update (Mar. 2002).

(List continued on next page.)

*Primary Examiner*—Robert A. Hopkins
(74) *Attorney, Agent, or Firm*—Robert D. Watson; Jeffrey D. Myers

(57) ABSTRACT

A method, composition, and apparatus for removing contaminant species from an aqueous medium comprising: providing a material to which zirconium has been added, the material selected from one or more of zeolites, cation-exchangeable clay minerals, fly ash, mesostructured materials, activated carbons, cellulose acetate, and like porous and/or fibrous materials; and contacting the aqueous medium with the material to which zirconium has been added. The invention operates on all arsenic species in the form of arsenate, arsenite and organometallic arsenic, with no pretreatment necessary (e.g., oxidative conversion of arsenite to arsenate).

26 Claims, 4 Drawing Sheets

OTHER PUBLICATIONS

E. Farfantorres, et al., "Pillared clays: preparation and characterization of zirconium pillared montmorillonite", *Catalysis Today* 15(#3–4):515–526 (1992).

S. Peraniemi, et al., "Optimized arsenic, selenium and mercury determinations in aqueous–solutions by energy–dispersive X–ray–fluorescence after preconcentration onto zirconium–loaded activated–charcoal", *Analytica Chimica Acta* 302(#1):89–95 (1995).

T. Viraraghavan, et al., "Arsenic in drinking water: Problems and solutions", *Water Science And Technology* 40(#2):69–76 (1999).

S. Yamanaka, et al., "High Surface–area solids obtained by reaction of montmorillonite with zirconyl Chloride", *Clays And Clay Minerals* 27(#2):119–124 (1979).

* cited by examiner

US 6,824,690 B1

ZIRCONIUM-MODIFIED MATERIALS FOR SELECTIVE ADSORPTION AND REMOVAL OF AQUEOUS ARSENIC

GOVERNMENT RIGHTS

The Government has rights to this invention pursuant to Contract No. DE-AC04-94AL85000 awarded by the U.S. Department of Energy.

BACKGROUND OF THE INVENTION

1. Field of the Invention (Technical Field)

The present invention relates to modifying zeolite, montmorillonite minerals, activated carbon and other materials in order to increase their affinity for arsenic species, and their use in selectively removing arsenic species from an aqueous medium. The preferred modifiers are water soluble zirconium-containing chemicals, e.g., zirconyl chloride, zirconium acetate, and zirconyl nitrate.

2. Background Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Arsenic has long been known as a highly toxic element. In order to reduce the public health risks from arsenic in drinking water, the United States Environmental Protection Agency (EPA) recently set the arsenic standard for drinking water at 10 ppb down from an original 50 ppb, emphasizing the need for more efficient and cost-effective means for water treatment to remove trace arsenic.

Arsenic exists in two soluble and dangerous oxidation states, $As^{3+}$, which is known as arsenite, and $As^{5+}$, which is known as arsenate. Both forms are toxic and exist in groundwater, although arsenite is the more lethal and the more difficult to remove.

Higher levels of arsenic are generally to be found in ground water rather than in surface water sources of drinking water. The western states of the United States, e.g., New Mexico, have a great number of water systems with arsenic levels greater than 10 ppb. Therefore, to meet the new As standard for water, it is imperative to seek other cost-effective, easy-to-use technologies that could effectively remove As from water.

Conventionally various techniques have been examined to remove As from water, such as precipitation (e.g., salts of iron, aluminum, or copper) and coagulation and filtration processes. However, these conventional methods are generally unable to successfully remove the As to lower levels due to the affinity and solubility limitation of the resultant products. The procedures are also time-consuming and expensive, and so not cost-effective.

One method for removing arsenic species from an aqueous medium is the use of an alumina sorbent, as discussed in U.S. Pat. No. 5,556,545, to Volchek, et al. However, the method has some inherent limitations, requiring regeneration and conditioning of the sorbent. Therefore, this regeneration process creates a hazardous solution. Furthermore, the regeneration process results in loss of the sorbent, thus increasing the cost of using activated alumina as a method for removing arsenic from an aqueous medium.

Another method to remove arsenic species from an aqueous medium is ion exchange. One of the disadvantages of this process is that the ion-exchangers utilized are mostly synthetic resins and hence are very expensive. See, e.g., Japanese Patent Application Publication No. H06-304573, to Masafumi, et al. Furthermore, few resins are selective in arsenic removal. A variety of anions such as sulfates compete for the ion-exchange sites in the resin. In general, ion-exchange is not a feasible method of removing arsenic from an aqueous medium if the medium contains a high level of dissolved solids or sulfate concentrations.

Another method for removing arsenic species from an aqueous medium is through the use of a membrane process. A membrane process involves passing the aqueous medium through the membrane to filter the selected material. However, membrane processes are costly as a method for removing arsenic species from an aqueous medium.

A recently disclosed method is the use of zirconium-impregnated resin as disclosed in U.S. Pat. No. 6,077,809, to Suzuki, et al. The adsorbent material consists of a porous carrier material such as crosslinked polyacrylate resin beads and a crystalline hydrous zirconium oxide impregnating the pores of the carrier in the monoclinic or cubic crystal form. The adsorbent material is prepared by soaking the carrier material with an alcohol solution of a zirconium compound such as zirconium oxychloride to impregnate the pores with the zirconium compound, followed by hydrolysis of the zirconium compound with an aqueous alkaline solution to convert the same into zirconium hydroxide and subjecting the carrier material impregnated with zirconium hydroxide to a hydrothermal reaction under specific conditions to convert the zirconium hydroxide into crystalline hydrous zirconium oxide which has a monoclinic or cubic crystal form depending on the acidity or alkalinity of the aqueous medium employed in the hydrothermal treatment. This method is not only complicated and very expensive but also involves harsh synthesis conditions. Additionally, the regeneration process creates hazardous solutions.

Another recently disclosed method is the use of pure zirconium hydroxide as a paste in water filters, as disclosed in U.S. Pat. No. 6,383,395, to Clarke, et al. The media includes a material selected from zirconium hydroxide, titanium hydroxide, hafnium hydroxide and combinations thereof. The media is preferably in powder form when used to treat water. The media needs to be regenerated repeatedly in order to reduce the cost, while it creates hazardous solutions that need to be disposed of at a cost. Because the media used is in the form of a paste, it does not have high hydraulic permeability and requires use at high pressure. This significantly limits the use of the material to small, high-pressure systems.

Zirconium-loaded activated charcoal has been used in analytical procedures as an adsorbent material for preconcentrating inorganic compounds of As(V), Se(IV), Se(VI), and Hg(II) in aqueous solutions.

The present invention employs materials comprising zirconium bound to zeolite, montmorillonite, activated carbon, fly ash, and like other materials (e.g., cellulose acetate or a cation-exchangeable clay mineral other than montmorillonite, or mesostructured materials (e.g., silica)) for removing arsenic species from an aqueous medium. Zirconium is reported to be environmentally benign, having low biotoxicity and is relatively inexpensive. Both zeolite and bentonite minerals are naturally occurring, inexpensive minerals. They are ubiquitous in the western states of the United States of America.

Zeolites and smectite contain a net negative charge due to isomorphous substitution in the aluminosilicate layers. In nature, this charge is neutralized by inorganic cations such as $Na^+$ or $Ca^{2+}$ on the clay interlayers and external surfaces. Hydration of these cations in the presence of water initiates a separation of the smectic clay layers causing a swelling of the clay. Zeolites have a generally three-dimensional open framework with channels that accommodate water molecules and cations.

Both zeolite and bentonite (mainly montmorillonite) clay minerals are used widely in the construction of liners for hazardous waste landfills, slurry walls, industrial waste treatment lagoons, sewage lagoons, and tank forms. Activated carbon has been used widely in water treatment due to its high surface area, low cost, and sorptive properties for many compounds.

Other background materials include U.S. Pat. No. 4,046,687, to Schulze; P. Bermejo-Barrera, et al., "A Comparison of different chemical modifiers for the direct determination of arsenic in sea water by electrothermal atomic absorption spectrometry". *Fresenius Journal Of Analytical Chemistry* 355(#2):174–179 (1996); Y. L. Chen, et al., "Determination of arsenic(v) and arsenic(iii) species in environmental-samples by coprecipitation with zirconium hydroxide and pre-atomization atomic-absorption spectrometry", *Journal Of Analytical Atomic Spectrometry* 8(#2):379–381 (1993); E. Farfantorres, et al., "Pillared clays: preparation and characterization of zirconium pillared montmorillonite", *Catalysis Today* 15(#34):515–526 (1992); S. Peraniemi, et al., "Optimized arsenic, selenium and mercury determinations in aqueous-solutions by energy-dispersive X-ray-fluorescence after preconcentration onto zirconium-loaded activated-charcoal", *Analytica Chimica Acta* 302(#1):89–95 (1995); T. Viraraghavan, et al., "Arsenic in drinking water: Problems and solutions", *Water Science And Technology* 40(#2):69–76 (1999); S. Yamanaka, et al., "High Surface-area solids obtained by reaction of montmorillonite with zirconyl Chloride", *Clays And Clay Minerals* 27(#2):119–124 (1979); Y. W. You, et al., "Removal of arsenite from aqueous solutions by anionic clays", *Environmental Technology* 22(#12):1447–1457 (2001). The high surface-area material produced by reacting montmorillonite with zirconyl chloride is useful for catalysis reactions.

SUMMARY OF THE INVENTION
(DISCLOSURE OF THE INVENTION)

The present invention is of a method for removing contaminant species from an aqueous medium, comprising: providing a material to which zirconium has been added, the material selected from one or more of zeolites, cation-exchangeable clay minerals, fly ash, mesostructured materials, activated carbons, cellulose acetate, and like porous and/or fibrous materials, and contacting the aqueous medium with the material to which zirconium has been added. In the preferred embodiment, the method removes one or more species of arsenic, more preferably all arsenic species in the form of arsenate, arsenite and organometallic arsenic (with no pretreatment necessary, such as oxidative conversion of arsenite to arsenate). The method preferably selectively removes the arsenic species to below approximately 10 ppb, most preferably to below approximately 1 ppb. The material preferably has zirconium added via an aqueous solution of one or more compounds selected from zirconyl chloride (most preferred), zirconyl nitrate, and zirconium acetate (which solution may be preheated). Clinoptilolite and montmorillonite are the preferred materials to which zirconium is added. The aqueous medium is preferably groundwater, tap water, or wastewater and can have a wide-ranging pH of from approximately 2 to approximately 10. The contaminant is preferably one or more of the group consisting of arsenic, fluoride, selenium, phosphate, molybdenum, mercury, chromate, heavy metals, and radionuclides. The material to which zirconium has been added may be placed in any of the following: water filters, impermeable barriers, permeable barriers, liners, columns, filtration membranes, and synthetic geomembranes.

The invention is also of a composition of matter comprising a material to which zirconium has been added, the material selected from one or more of fly ash, mesostructured materials, cellulose acetate, and cation-exchangeable clay minerals other than montmorillonite.

The invention is additionally of a method of making a composition of matter useful for removing contaminant species from an aqueous medium, comprising: providing a material selected from one or more of zeolites, cation-exchangeable clay minerals, fly ash, mesostructured materials, activated carbons, cellulose acetate, and like porous and/or fibrous materials; and adding zirconium to the material. In the preferred embodiment, an aqueous solution of one or more compounds selected from zirconyl chloride, zirconyl nitrate, and zirconium acetate is employed to provide the zirconium, which solution may be preheated. The material is preferably placed in the solution for less than or equal to approximately three days. The material may then be placed in any of the following: water filters, impermeable barriers, permeable barriers, liners, columns, filtration membranes, and synthetic geomembranes. The material is preferably rinsed, sieved to remove fines, air dried, and/or calcined.

The invention is further of an apparatus for removing contaminant species from an aqueous medium, comprising: a material to which zirconium has been added, the material selected from one or more of the group consisting of zeolites, cation-exchangeable clay minerals, fly ash, mesostructured materials, activated carbons, and cellulose acetate; and means for contacting the aqueous medium with the material to which zirconium has been added. In the preferred embodiment, the material comprises clinoptilolite and/or montmorillonite. The contacting means preferably comprises one or more of the following: water filters, impermeable barriers, permeable barriers, liners, columns, filtration membranes, and synthetic geomembranes.

A primary object of the present invention is to develop cost-effective, easily manufactured and applied adsorbents capable of removing arsenic from drinking water, surface water groundwater and wastewater and that can be applied in a variety of treatment systems and configurations.

An advantage of the present invention is the ease of manufacturing the materials, very low cost, and ease of disposal. By simply immersing substrates such as zeolite, montmorillonite, or activated carbon in a zirconium-containing solution using the methods described herein, a new class of cost-effective adsorbents for arsenic (III), arsenic (V), organic arsenic and other contaminants is presented.

Another advantage of the present invention is that the materials can be easily engineered in granular form of different sizes. This permits design of column type containers for water treatment allowing the material to be used in small and very large treatment systems. The materials can also be used in the form of powders.

Yet another advantage of the invention is that no pretreatment of the water is necessary. The adsorbents have high selectivity for all three forms of arsenic: arsenate, arsenite, and organometallic arsenic.

Another advantage of the present invention is that it is very inexpensive in comparison with traditional methods for arsenic removal from water. The principles of the invention are suited to allow nearly complete removal of arsenic from drinking water, surface water, groundwater, and wastewater at minimum cost.

A further advantage of the present invention is that the zirconium-containing adsorbents (after removing, for example, arsenic) can be easily disposed in landfills without recycling.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DESCRIPTION OF THE PREFERRED EMBODIMENTS

Figure 1:
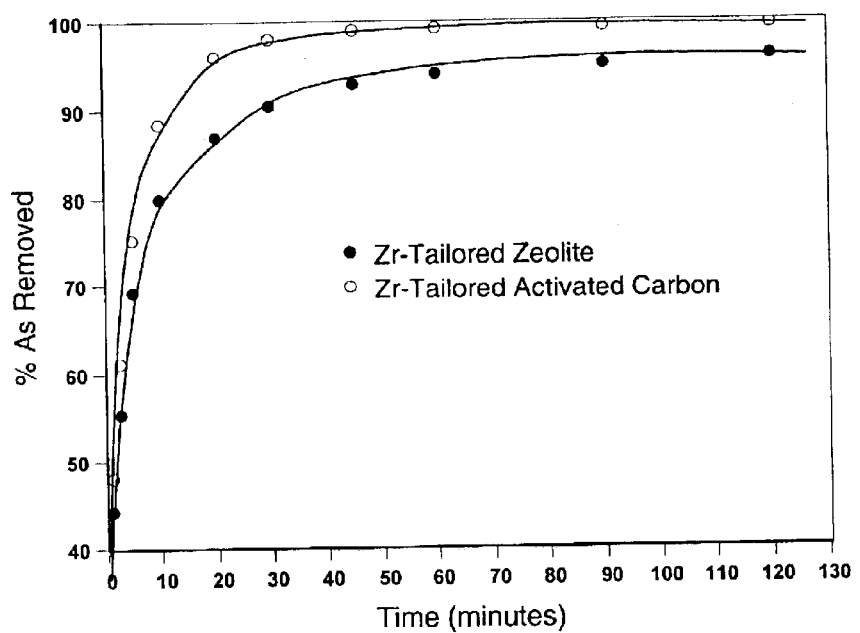
FIG. 1 is a graph of the sorption kinetic of As(V) onto the Zr-zeolite and Zr-activated carbon materials of the invention; initial As(III)=25 ppb and As(V)=25 ppb in 400 ml simulated groundwater; Zr-tailored material=10.0 g.

Best Modes for Carrying out the Invention

The present invention concerns use of various materials to remove arsenic species from water. Arsenate, arsenite, and organometallic arsenic are selectively removed using zirconium bound to zeolite, montmorillonite, activated carbon, fly ash, and like materials (e.g., cellulose acetate or a cation-exchangeable clay mineral other than montmorillonite) in the presence of competing species including sulphate, nitrate, bicarbonate, fluoride, phosphate, and chloride. These materials are cost-effective adsorbent materials for sequestering arsenic (III), arsenic (V) and organometallic arsenic from drinking water, tap water, surface water groundwater, and wastewater.

The media of the invention can also be used to remove fluoride, phosphate, selenium, molybdenum, mercury, radionuclides and combinations thereof from drinking water, tap water, surface water groundwater, and wastewater. A major benefit of this invention is the ability to attach zirconium species to cation-exchangeable minerals and activated carbon without the use of binders, pastes or other adhesives. The result is a very economical material for water treatment.

Another major benefit of the invention is the fact the media will remove all three forms of arsenic from water: arsenate, arsenite and organometallic arsenic. The media can be produced in a variety of configurations, is very inexpensive to produce, is environmentally friendly, and can be employed in a variety of devices and configurations for water treatment including water treatment using home and industrial cartridge type water filters, well and barrier liners, small and large water treatment systems, and other water treatment systems.

Zirconium easily undergoes hydrolysis at room temperature to produce a zirconium oligomer, whose structure is believed to be the square planar complex $[Zr_4(OH)_8(H_2O)_{16}Cl_z]^{(8-z)+}$, a polycation. Therefore, it can be adsorbed onto the surface of cation-exchangeable minerals. Activated carbon has been reported to have high affinity for zirconium at low pH (pH <1.8). By simple ion-exchange or hydrogen bonding or other bonding mechanisms, the zirconium can be attached to the surface of zeolite, montmorillonite, or activated carbon, and during rinsing it is typically changed into the form of zirconium hydroxide.

Industrial Applicability

The invention is further illustrated by the following non-limiting examples.

Example 1

Clinoptilolite (a zeolite mineral) was used as the starting material in this example. However, any presently known and subsequently discovered zeolite mineral can be employed in the invention. The starting material, produced by St. Cloud Mining Company (Truth or Consequences, New Mexico), had a variety of particle size ranging from powder to aggregates. For this example, 40×80 mesh and 14×40 mesh particles were used. The zeolite was rinsed with deionized water (DI) on 100 mesh sieve to remove the fine particles, and air-dried at 60 degrees C. in an oven. Subsequently, a certain amount of the dried zeolite was immersed in 0.1 M $ZrOCl_2$ solution (solid/solution ratio=2:1 w/v) at room temperature for 1–3 days to form Zr-impregnated zeolite (note that the solution may also be preheated). The treated zeolite was filtered on 100 mesh sieve and rinsed with DI water until free of fine particles and the pH of the rinsing water was close to original pH. Finally, the Zr-zeolite was dried in an oven at 60–80 degrees C. or at a higher temperature.

TABLE 1

| Simulated Groundwater | | | | | |
|---|---|---|---|---|---|
| $Na^+$: | 73.7 ppm | $Ca^{2+}$: | 40.1 ppm | $Mg^{2+}$: | 12.6 ppm |
| $HCO_3^-$: | 183.0 ppm | $Cl^-$: | 71.0 ppm | $SO_4^{2-}$: | 50.0 ppm |
| $NO_3^-$: | 2.0 ppm | $F^-$: | 1.0 ppm | $HPO_4^{2-}$: | 0.04 ppm |

A kinetic study was carried out using 10 g Zr-zeolite in 400 ml simulated groundwater (see Table 1). Aliquots of sample (5 ml) were collected at 1, 2.5, 5, 10, 20, 30, 45, 69, 90, 120 minutes and filtered through 0.2 µm filter. The samples were assayed for As concentration using Inductively Coupled Plasma—Mass Spectrometry (ICP-MS). FIG. 1 indicates that the sorption of As by Zr-zeolite is a rapid process.

Figure 2:
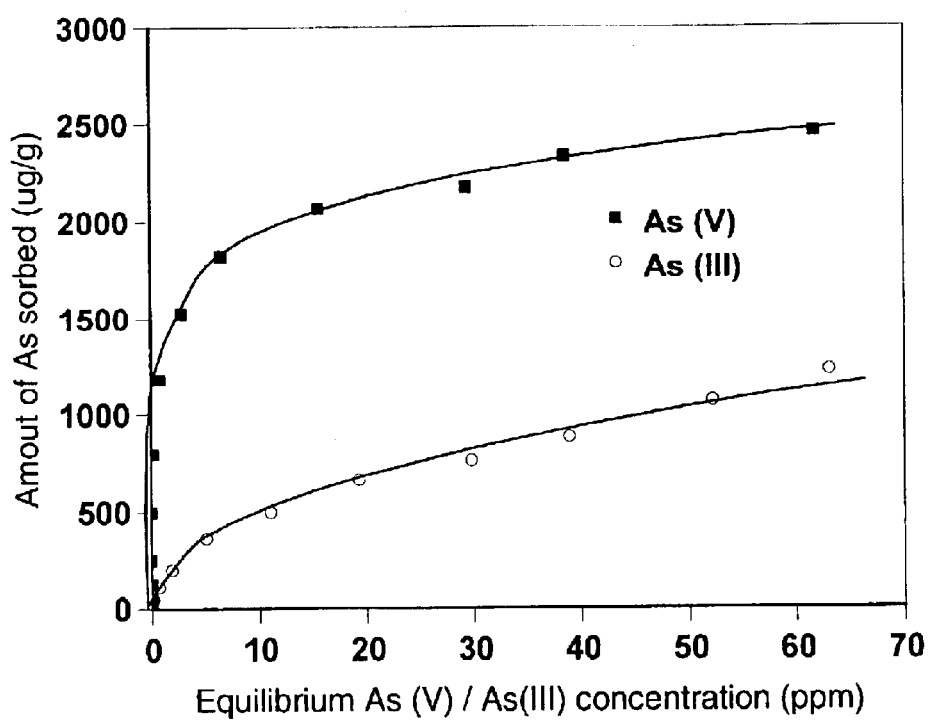
FIG. 2 is a graph of the sorption isotherms of arsentate and arsenite in simulated groundwater by the Zr-zeolite material of the invention; Zr-zeolite amount=1.0 g; solution volume= 25 ml.
Figure 3:
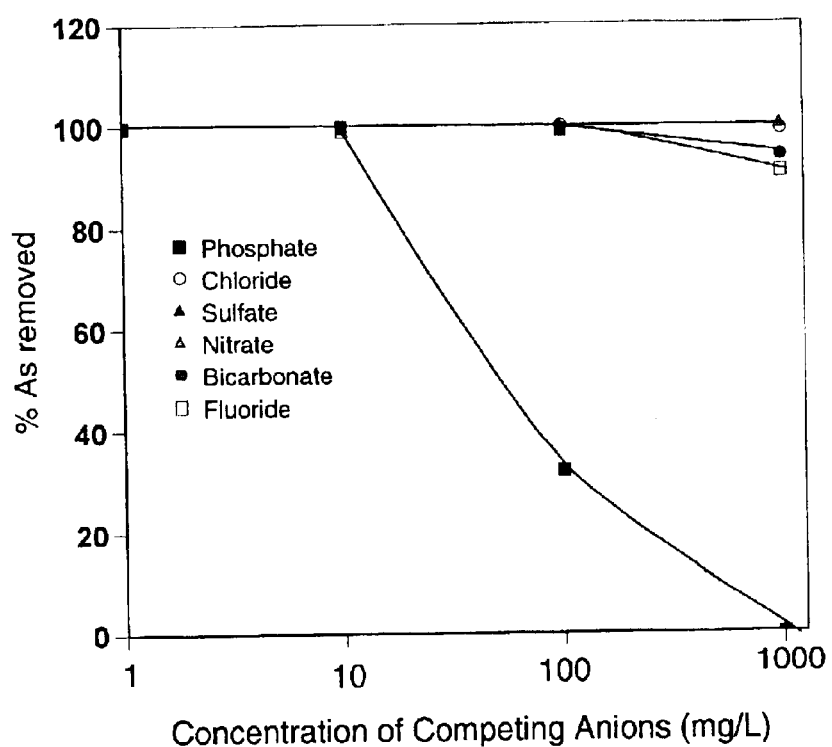
FIG. 3 is a graph of the effects of competing anions on arsenate sorption by the Zr-zeolite materials of the invention; initial As(V)=1000 ppb, solution volume=25 ml, Zr-zeolite amount=0.5 g.
Figure 4:
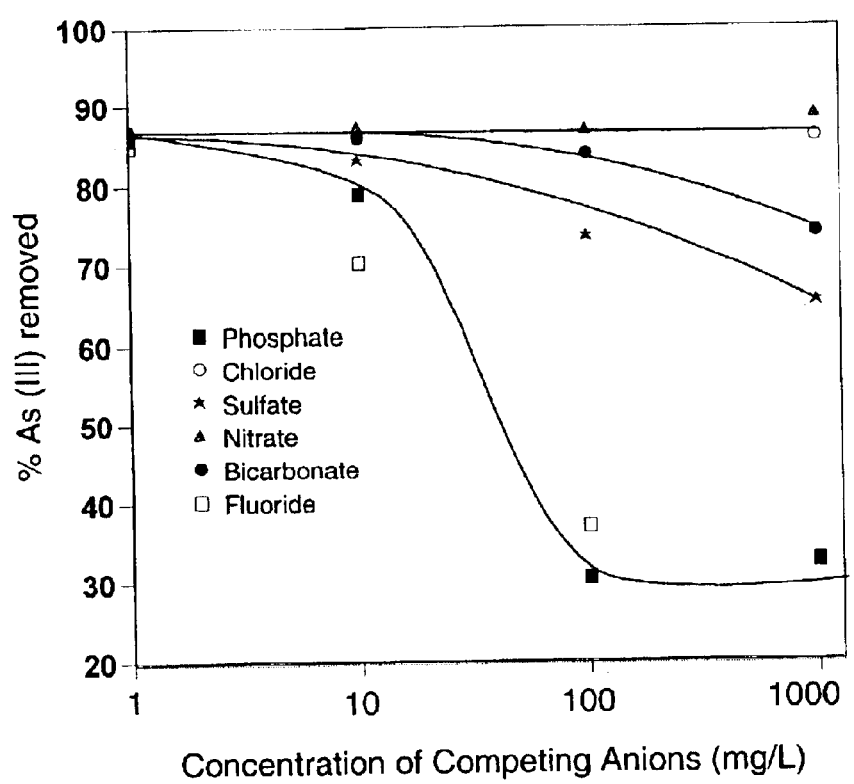
FIG. 4 is a graph of the effects of competing anions on arsenate sorption by the Zr-zeolite materials of the invention; initial As(III)=1000 ppb, solution volume=25 ml, Zr-zeolite amount=0.5 g.

Adsorption isotherm was studied using a batch equilibration technique. Known amounts of the materials were weighed into a 30 ml polyethylene centrifuge tubes that contained 25 ml simulated groundwater. They were then spiked with an aliquot of As stock solution (1000–5000 ppm). The mixtures were shaken at low speed for ~24 hours, centrifuged, and the supernatant As concentration determined by using ICP-MS. Arsenate ($NaAsO_3 \cdot H_2O$), arsenite ($NaAsO \cdot H_2O$), or organoarsenic (($CH_3)_2AsNaO_2$) were obtained from Aldrich and used as received. Studies were also carried out to examine the effects of competing anion on arsenic removal by using 0.5 g Zr-zeolite in 25 ml deionized water. FIG. 2 indicates that both arsenate and arsenite are strongly adsorbed by the Zr-zeolite of the invention. FIGS. 3 and 4 indicate that most of the anions occurring in the groundwater have little effect on arsenate and arsenite removal by Zr-zeolite. The sorption of arsenate and arsenite is highly selective. Phosphate and fluoride would compete for arsenic removal.

Accordingly, another embodiment of the present invention comprises pre-treating the arsenic-contaminated water by removing competing contaminant species (e.g., phosphate and fluoride) with a conventional treatment method (e.g., iron-based absorption media), followed by removing arsenic with the zirconium-based adsorbent media of the present invention. In general, groundwater contains very low phosphate, in which case this pre-treatment step would not be necessary. However, surface water can contain significant amounts of phosphate. Fluoride, on the other hand, can be high (approx. 1 ppm) in groundwater. However, the maximum sorption efficiency of fluoride onto zirconium occurs at a low pH range (approx. 4.5), so the presence of fluoride may not interfere (i.e., compete with) the removal of arsenic in groundwater with a higher pH (approx. 8.0).

A column study was also carried out. A glass column having an inner diameter of 1.5 cm was filled with 20.5 g of the Zr-zeolite material having a height of 12.5 cm. The flow rate was 0.8 ml/min. Arsenic containing water was prepared using simulated ground water. It contains 25 ppb arsenate and 25 ppb arsenite. The column study indicated that negligible arsenic (<1 ppb) was detected in the effluent solution after 40 L of the water passing through without any sign of breakthrough. Based upon the adsorption isotherms, it is estimated that the column could treat at least 200 L simulated groundwater used in this study. Furthermore, no zirconium (<1 ppb) was found in the effluent solution.

Example 2

Wyoming bentonite (mainly montmorillonite) was used as the starting material in this example. However, any presently known cation-exchangeable clay minerals, e.g., saponite, beidellite, illite, laponite, hectorite, vermiculite, mica, and subsequently discovered minerals can also be used for this purpose. Reference montmorillonite clay, SWy-1 (Source Clay Repository of the Clay Mineral Society) was dispersed in water using $Na_2CO_3$ and the <2 micro-m fractions separated using wet sedimentation. Zr-Montmorillonite was synthesized by titrating freshly prepared 0.25 M $ZrOCl_2$ into a well-dispersed clay suspension (1 g/100 ml) to reach a final of 0.25 mmol Zr/g clay. The suspension was continuously stirred at room temperature for 2 hours, filtered, and washed (or dialyzed) extensively against deionized water (DI) until the pH of the rinsing water was close to normal or the conductivity was below 0.01 ds $m^{-1}$. The samples were dried at 60–80° C., ground and stored in polyethylene bottles before use. A portion of the sample was calcined at 400° C. for 2 hours. Table 2 indicates that Zr-montmorillonite has strong affinity and capacity for arsenate, arsenite, and organoarsenic.

TABLE 2

| Initial As | Final As concentration (ppb) | | |
|---|---|---|---|
| (ppb) | As(V) | As(III) | Organoarsenic |
| 100 | 0.92 | ND | ND |
| 250 | 1.7 | ND | ND |
| 500 | 5.4 | ND | ND |
| 1000 | 19.2 | 38 | 160 |
| 2000 | 30.1 (180) | 101 (230) | 420 |
| 5000 | 52.0 (1310) | 380 (990) | 1560 |
| 10000 | 125 | 1050 | 3970 |

*50 mg Zr-montmorillonite in 25 ml simulated ground water; ND = not determined; Numbers in parentheses are sorption using 50 mg calcined Zr-montmorillonite.

Example 3

Activated carbon (2 mm) from Baker J. T. was manually ground to obtain 20×80 mesh particles and fine particles (>100 mesh). A certain amount of the dried activated carbon was immersed in 0.1 M $ZrOCl_2$ solution (solid/solution ratio=2:1~10:1 w/v) at room temperature for 1–3 days to form Zr-impregnated activated carbon. The treated carbon was filtered and rinsed with DI water until the pH of the rinsing water was close to the original. The product was dried in an oven at 60–80 degrees C.

A kinetic study was carried out using 10 g Zr-Activated carbon (20×80 mesh) in 400 ml simulated groundwater. Aliquots of sample (5 ml) were collected at 1, 2.5, 5, 10, 20, 30, 45, 69, 90, 120 minutes and filtered through 0.2 micro-m filter. The samples were assayed for As concentration using ICP-MS. FIG. 1 indicates that the sorption of arsenate and arsenite to Zr-activated carbon is a rapid process.

A column study was also carried out. A glass column having an inner diameter of 1.5 cm was filled with 10.5 g of the Zr-Activated carbon material having a height of 12.5 cm. FIG. 4 indicates that trace arsenate and arsenite can both be removed upon passing through the Zr-activated carbon. Table 3 indicates that the finer the carbon substrate, the higher the arsenic removal efficiency. By choosing appropriate activated carbon with different size and surface area, it is possible to adjust the zirconium loading and thus the removal efficiency.

TABLE 3

| Absorbent | Amount | As initial [ ] (ppb) | As final [ ] (ppb) |
|---|---|---|---|
| Zr-Coarse AC (20 × 80 mesh) | 5 g | 185 As(V) | 4.6 |
| Zr-Coarse AC (20 × 80 mesh) | 5 g | 182 As(III) | 5.3 |
| Zr-Fine AC (>100 mesh) | 0.5 g | 185 As(V) | 9.3 |

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for removing contaminant species from an aqueous medium, the method comprising the steps of:
   providing a material to which zirconium has been impregnated, the material selected from one or more of the group consisting of clinoptilolite and montmorillonite; and
   contacting the aqueous medium with the material to which zirconium has been impregnated.

2. The method of claim 1 wherein the method removes one or more species of arsenic.

3. The method of claim 2 wherein the method removes all arsenic species in the form of arsenate, arsenite and organometallic arsenic, with no necessary pretreatment.

4. The method of claim 3 wherein the method selectively removes the arsenic species to below approximately 10 ppb.

5. The method of claim 4 wherein the method selectively removes the arsenic species to below approximately 1 ppb.

6. The method of claim 1 wherein the providing step comprises providing a material to which zirconium has been impregnated via an aqueous solution of one or more compounds selected from the group consisting of zirconyl chloride, zirconyl nitrate, and zirconium acetate.

7. The method of claim 6 additionally comprising the step of preheating the aqueous solution.

8. The method of claim 6 wherein the providing step comprises providing a material to which zirconium has been impregnated via an aqueous solution of zirconyl chloride.

9. The method of claim 1 wherein the aqueous medium comprises water selected from the group consisting of groundwater, tap water, and wastewater.

10. The method of claim 1 wherein the aqueous medium has a pH of from approximately 2 to approximately 10.

11. The method of claim 1 wherein the contaminant is one or more of the group consisting of arsenic, fluoride, selenium, phosphate, molybdenum, mercury, chromate, heavy metals, and radionuclides.

12. The method of claim 1 additionally comprising the step of placing the material to which zirconium has been impregnated in an apparatus selected from the group consisting of water filters, impermeable barriers, permeable barriers, liners, columns, filtration membranes, and synthetic geomembranes.

13. A composition of matter comprising a material to which zirconium has been impregnated, the material selected from one or more of the group consisting of fly ash, mesostructured materials, cellulose acetate, and cation-exchangeable clay minerals other than montmorillonite.

14. A method of making a composition of matter useful for removing contaminant species from an aqueous medium, the method comprising the steps of:
   providing a material selected from one or more of the group consisting of zeolites, cation-exchangeable clay minerals, fly ash, mesostructured materials, activated carbons, and cellulose acetate; and
   impregnating the material with zirconium by providing a preheated aqueous solution of one or more compounds selected from the group consisting of zirconyl chloride, zirconyl nitrate, and zirconium acetate.

15. The method of claim 14 wherein the impregnating step comprises placing the material in the aqueous solution for less than or equal to approximately three days.

16. The method of claim 14 additionally comprising the step of placing the material to which zirconium has been impregnated in an apparatus selected from the group consisting of water filters, impermeable barriers, permeable barriers, liners, columns, filtration membranes, and synthetic geomembranes.

17. The method of claim 14 additionally comprising the step of rinsing the material.

18. The method of claim 14 additionally comprising the step of sieving the material to remove fines.

19. The method of claim 14 additionally comprising the step of air drying the material.

20. The method of claim 14 additionally comprising the step of calcining the material.

21. An apparatus for removing contaminant species from an aqueous medium, said apparatus comprising:
   a material to which zirconium has been impregnated, said material selected from one or more of the group consisting of clinoptilolite and montmorillonite; and
   means for contacting the aqueous medium with said material to which zirconium has been impregnated.

22. The apparatus of claim 21 wherein said contacting means comprises a means selected from the group consisting of water filters, impermeable barriers, permeable barriers, liners, columns, filtration membranes, and synthetic geomembranes.

23. The method of claim 1 further comprising the step of pre-treating the aqueous medium to remove competing contaminant species before contacting the aqueous medium with the material to which zirconium has been impregnated.

24. The method of claim 23 wherein the competing contaminant species comprise one or both of phosphate and fluoride.

25. A method for removing contaminant species from an aqueous medium, the method comprising the steps of:
   providing a material to which zirconium has been impregnated, the material selected from one or more of the group consisting of zeolites, cation-exchangeable clay minerals, fly ash, mesostructured materials, activated carbons, cellulose acetate, and like porous and/or fibrous materials;
   pre-treating the aqueous medium to remove competing contaminant species comprising one or both of phosphate and fluoride; and
   contacting the pre-treated aqueous medium with the material to which zirconium has been impregnated.

26. The composition of matter of claim 13 wherein the material to which zirconium has been impregnated comprises clinoptilolite.

* * * * *